Figure 1:
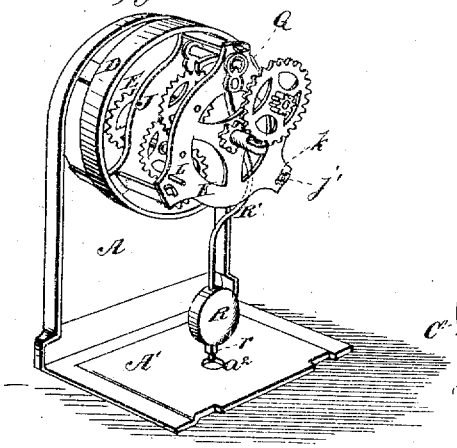

3 Sheets—Sheet 1.

A. E. HOTCHKISS.

Clock Movement.

No. 9,656. Reissued April 12, 1881.

Witnesses.
Robert Everett
Edward G. Siggers

Inventor.
Arthur E. Hotchkiss
by W. H. Babcock
Atty.

A. E. HOTCHKISS.
Clock Movement.

No. 9,656. Reissued April 12, 1881.

Witnesses.
Robert Everett.
Edward G. Siggers

Inventor.
Arthur E. Hotchkiss
by W. H. Babcock.
Atty.

3 Sheets—Sheet 3.

A. E. HOTCHKISS.
Clock Movement.

No. 9,656. Reissued April 12, 1881.

Witnesses.
Robert Everett.
Edward G. Siggers

Inventor.
Arthur E. Hotchkiss
by Wm H. Babcock.
Atty.

UNITED STATES PATENT OFFICE.

ARTHUR E. HOTCHKISS, OF CHESHIRE, CONNECTICUT.

CLOCK-MOVEMENT.

SPECIFICATION forming part of Reissued Letters Patent No. 9,656, dated April 12, 1881.

Original No. 221,310, dated November 4, 1879. Application for reissue filed January 22, 1881.

*To all whom it may concern:*

Be it known that I, ARTHUR E. HOTCHKISS, of Cheshire, in the county of New Haven and State of Connecticut, have invented certain new and useful Improvements in Clock-Movements; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

This invention relates to that class of time-pieces in which a fixed annular rack or internally-toothed wheel is employed to aid a spring-barrel in rotating the train of wheels.

The nature of said invention consists, partly, in the combination of a fixed internally-toothed circular rack and a concentric going-barrel or plate with a mainspring, a transmitting-wheel rotating with said barrel, and a fixed clock-movement.

It also consists in arranging the operating parts of the time-piece on a fixed plate, and attaching the same to the back of the clock-case by means of tongues, which extend out from said plate through perforations in the back of said case.

It also consists in providing said tongues with broad shoulders, which cause said plate to stand out from the back of the clock-case, so as to leave space for the mainspring between them.

It also consists in the combination of a mainspring having a perforated end with a lateral finger extending from the broad part of one of said tongues, whereby said mainspring is firmly held at its fixed end, yet easily detached.

It also consists in the combination, with a fixed plate which confines the mainspring and supports the movement, of a rotating plate arranged in front of said fixed plate, and provided with a hub, which extends through said fixed plate and is connected to the winding end of the mainspring.

It also consists in adapting to and combining with the hub thus constructed a key having a screw-threaded winding part for engaging with said hub, and a recessed part for engaging with the prismatic end of the center-shaft.

It also consists in constructing the annular rack or internally-toothed wheel with an annular recess for receiving the pillar-plate, and thereby economizing space.

It also consists in constructing the pillar-plate and pillars in one piece, and attaching said pillars to the front plate by twisting them.

It also consists in substituting an automatic winding-dog, operating like an escapement-verge, for the click and spring ordinarily used.

It also consists in constructing the case with an opening at the bottom, and adapting the key and the adjusting-nut of the pendulum-ball to one another, so that the adjustment of the said ball may be effected conveniently from outside of the case.

It also consists in providing said ball with a spring which will force it down into place, and with a guide which will prevent it from turning.

It also consists in further improvements, hereinafter set forth and claimed.

Figure 3:
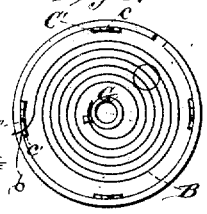
Figure 2:
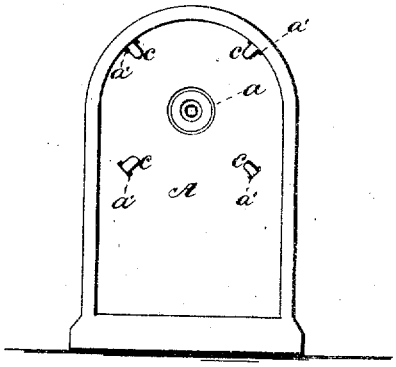
Figure 4:
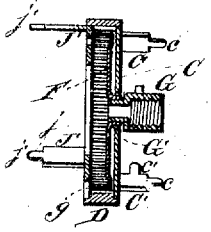
Figure 5:
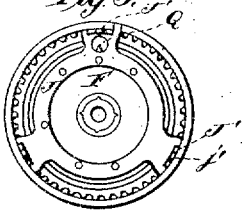
Figure 6:
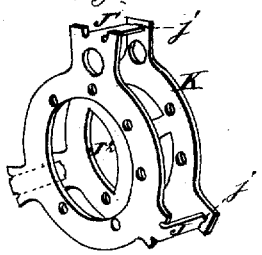
Figure 7:
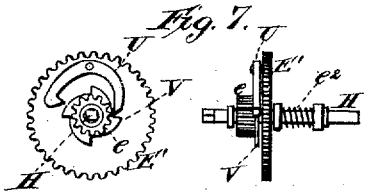
Figure 8:
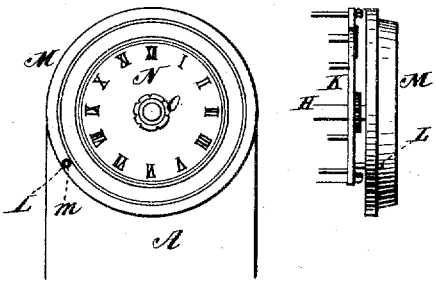
Figure 9:
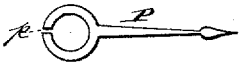
Figure 11:
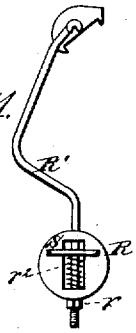
Figure 12:
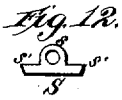
Figure 10:
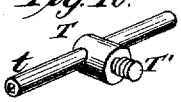
Figure 13:
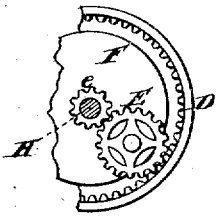
Figure 14:
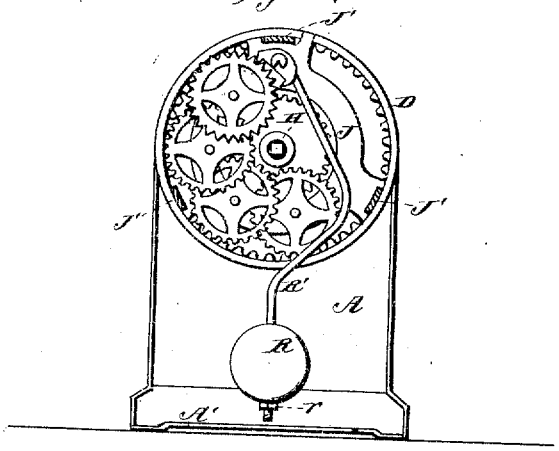
Figure 15:
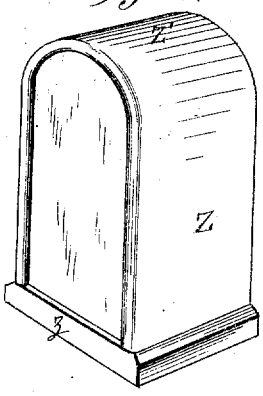
Figure 16:
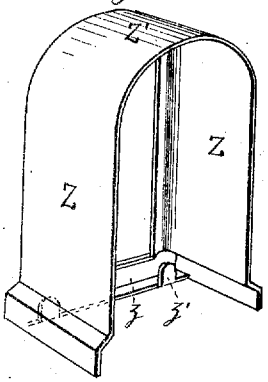
Figure 17:
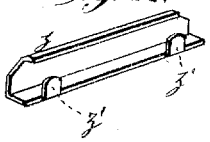
Figure 18:
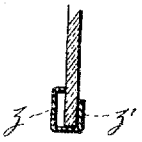

In the accompanying drawings, Figure 1 represents a front perspective view of a clock embodying my invention, the front of the case and the dial-plate having been removed. Fig. 2 represents a rear elevation of the case, showing the method of attaching the works thereto. Fig. 3 represents a rear detail view of the mainspring and the plate to which it is attached. Fig. 4 represents a detail sectional view of the fixed plate, the rotating plate, the pillar-plate, and the toothed ring or circular rack, showing the hollow winding-hub. Fig. 5 represents a front perspective detail of the recessed circular rack with the rear pillar-plate in position. Fig. 6 represents a detail view of the front and rear pillar-plates and pillars in position, showing the method of attaching the front pillar-plate to the pillars. Fig. 7 represents a detail view of my automatic winding-dog applied on the center wheel and shaft. Fig. 8 represents a front view of my dial-plate, showing the method of attachment of said plate to the front pillar-plate, and of the dial to said dial-plate. Fig. 9 represents a detail view of the slotted automatically-adjustable minute-hand. Fig. 10 represents a detail view of the key. Fig. 11 represents a detail view of the pendulum. Fig. 12 represents a detail view of the pendulum-ball guide-plate. Fig. 13 represents, in detail, the transmitting-wheel and adjacent parts. Fig. 14 represents, in front elevation, the train of wheels, pendulum, and the rear of the case. Fig. 15 represents a front perspective view of the front part of my clock-case. Fig. 16 represents a rear perspective view of the same. Figs. 17 and 18 show detail views of the bottom support for the clock-front in rear perspective and vertical section, respectively. Most of these details are enlarged from the scale of Fig. 1, to exhibit more plainly the smaller features of the device.

In said drawings, A designates the back of the clock-case, and A′ the bottom thereof. This case is made, preferably, of sheet metal, which may be nickel-plated, if desired, and the said back is constructed with a central opening, *a*, to receive the winding-hub, (hereinafter described,) and with smaller openings, *a′*, near the sides to receive the tongues, whereby the works are fastened to the case. The said case-bottom A is provided with an opening, $a^2$, which allows the entrance of the key to adjust the pendulum-ball. The construction of the clock-case and the adaptation of the works thereto allow the clock to be wound, set, and regulated without opening the case.

B designates the mainspring, and C a fixed disk or plate, which holds the same in position between said plate and the back of the clock. Said mainspring occupies the whole back of the space occupied by the works, so as to give the greatest running power with the least possible expense of room, one of the leading objects of my invention being to render it possible to make a cheap, neat, and satisfactory time-piece of unusually small size. Many of the features of said invention are, however, applicable to large clocks or other large time-pieces as well.

The said plate C forms a sort of base-plate or attaching-plate for all the works of the watch, so that when it is detached from the watch-case all of said works will come off with it.

The attachment of said plate to said case is effected as follows: C′ designates four or more short flanges, formed in one piece with plate C and terminating in square shoulders, which rest against the back A. These flanges are formed with narrow rearwardly-extending tongues or claws *c*, which pass through said openings *a′* in said clock-case back, and are bent on the outside thereof, so as to clamp said plate and its attachments in place. These tongues or claws *c* have sufficient strength to hold the light works permanently in position; but they are readily straightened to allow the separation of works and case for cleaning and other purposes.

The flanges C′ answer the same purpose as the sides of an ordinary watch barrel in holding the expanding mainspring in place, and the fixed end of said mainspring B is attached to one of said flanges by means of a perforation in said spring, which sits over a finger, *c′*, formed on the side of said flange. This connection, though firm, allows easy and speedy detachment. The spaces between flanges C′ allow the spring B to be conveniently inspected.

On said fixed plate C, and extending considerably above the periphery of the same, is permanently secured a fixed internally-geared ring or circular rack, D, which meshes with and gives motion to a gear-wheel, E, carried by a rotating plate, F, which is similar in form to plate C and rests against it. These plates are concentric, and plate F is somewhat smaller than plate C. Plate F is provided with a central hollow hub, G, attached to a short hollow cylindrical bearing, G′, which extends through a central opening of plate C. To the outside of this hub the winding and operating end of mainspring B is attached. Thus the said mainspring operates to rotate said plate F.

The wheel E, carried by said rotating plate, is journaled on a rivet or headed stud formed with or attached to said plate. This method of attachment and journaling is very strong and secure, and, besides, avoids all necessity for an additional bearing or brace for the pivot-shaft. The said wheel E is, in effect, an idle-wheel, transmitting the action of the cogs in the stationary geared ring or circular rack to a pinion, *e*, on the center-shaft H and the train of wheels I. The center-shaft has its outer bearing in the cylindrical piece G′, and its inner bearing in the fixed front plate, hereinafter described, so that it does not turn with plate F, but is stationary with relation thereto. The remaining wheels of the train or movement are also stationary with reference to the motion of said plate, being journaled into plates J K. The only wheel which does not have a stationary axis is the transmitting-wheel E, whose function is that of an idle-wheel.

By making the movement stationary instead of causing it to be carried around by the revolving plates, (as movements have heretofore been carried by going-barrels operating with a fixed rack,) I avoid divers practical difficulties of manufacture incidental to the construction and use of so many wheels having moving axes and compound revolution. Moreover, I thereby adapt the movement to be used with a pendulum, which would otherwise be practically impossible, as the pendulum cannot well be made to revolve.

The train of wheels between plates J K is arranged as a whole in a circle concentric with the center-shaft and center-wheel, so as to occupy the least possible amount of space.

The construction of the plates C F and of the attached parts gives to my time-piece the combined advantages of a fixed barrel and a going-barrel. The fixed plate C effectually braces the revolving plate F, and the latter has no need of the flanges or side pieces found in an ordinary going-barrel. It is obvious, however, that said revolving plate F may be furnished with such flanges, if desired. This plate F is protected at the side by the circular rack D, and in front by the pillar-plate J. This pillar-plate is at a sufficient distance from said rotating plate to allow space for the transmitting-wheel E, and the center-pinion, with which it meshes. To enable said pillar-plate to be thoroughly braced by said rack, and also fit the parts together in the smallest possible space, the said rack is constructed with an internal annular recess, *g*, in its rear edge or corner. Said pillar-plate J is set into this recess. Said pillar-plate has a central opening, $J^2$, which is of sufficient size to allow the center-pinion, and preferably, also, the center-wheel, to pass through the same, thus allowing the convenient introduction and removal of said wheel, besides saving metal. The front plate, K, has a similar opening, which is crossed by a bearing-bar rigid with said plate, in which bar the front end of the center-shaft is journaled. This open construction of said plates facilitates the inspection of the work between them.

The pillars J′ are formed in one piece with said pillar-plate J, and preferably by striking up out of sheet metal. Each pillar terminates in square shoulders *j*, which abut against the rear side of front plate, K, and short arms or tips *j′*, which extend through holes *k* in said plate K. By twisting said tips said front pillar-plate is clamped to said pillars. This twisting may be effected by any convenient tool. When said tips are bent back again, so as to be straight, there is no difficulty in separating the pillar-plates.

The first plate K is triangular in shape, so as to give the greatest possible service as a support, with the least possible expenditure of material and increase of the weight of the clock. It requires but three pillars—one at each corner—to hold it firmly in position, as shown. Said front plate is provided with a fixed pin, L, which extends forward, so as to pass through a perforation, *m*, in the dial-plate M, so as to prevent said dial-plate from having rotary motion.

The dial N is attached to dial-plate M by an eyelet, O, which is struck up forward from the center of said plate and bent back upon said dial. Said eyelet is in one piece with said dial-plate. By having said eyelet in one piece with said dial-plate the danger of losing said eyelet is entirely obviated and the number of separate parts lessened. The dial-plate itself is held against the ends of the pillars by the hands of the watch, which are arranged and attached as usual, with the following exception: The center-shaft should be perfectly cylindrical, so as to exactly fit the hole in the minute-hand P but in practice some irregularity of shape in said shaft is frequently met with. To obviate this difficulty the inner end of the hand is slotted or split from the hole outward at *p*, as shown in detail in Fig. 9, the said hand being made of elastic material. The elasticity of the hand thus split will cause it to grasp tightly a shaft which is not a perfectly true cylinder, so that the hand will retain its proper place. This construction thus forms an automatic adjustment for said hand. Of course both hands may be constructed in this way.

Of course many of the features of my improved time-keeper may be used in a marine clock or other horological device which does not include a pendulum. In the accompanying drawings I have, however, shown a pendulum hung upon a knife-edge, and designated Q. As the peculiar method of hanging said pendulum is sufficiently covered by an earlier patent of my own, I need not describe it more particularly here. The pivot pin or shaft of said pendulum is above the center-shaft and the train of wheels surrounding the same. This gives sufficient swing for the pendulum-ball without unduly increasing the height of the clock or requiring a case of unusual size. The ball R of this pendulum is adjusted up and down on the rod R′ thereof by the nut *r*, to regulate the length of its oscillation and insure the proper action of the verge on the escapement. This nut *r* is made of the same size as the prismatic end of the center-shaft, so as to be operated by the same recessed arm *t* of the key T. (Shown in detail in Fig. 10.) This arm *t* is passed up through the opening in the bottom of the clock-case, hereinbefore described, so that the clock can be regulated readily without opening said case. Said pendulum Q is shown in detail in Fig. 11. Its ball R is provided with a long vertical recess, *r′*, through which rod R′ passes. Said rod is surrounded within said recess by a helical spring, $r^2$, which bears at its upper end against a guide-plate, S, fixed to said rod R′, and at its lower end against said ball R. The effect of said spring is to hold said ball down to its proper place against nut *r*.

The construction of guide-plate S is clearly shown in detail in Fig. 12. It consists of a middle part, *s*, which extends into recess *r′*, and of straight wings *s′*, which extend on each side along the face of flattened ball R. These wings prevent said ball from turning on said rod. Such turning would cause unnecessary wear, and would interfere with the accuracy of the pendulum action.

The clock is wound by means of key T and hub G. Said hub is internally screw threaded, and extends to the outside of case-back A through opening *a*. Key T is T-shaped, and provided with a screw-threaded extension, T′, which fits the threads of said hub. When the clock is to be wound said extension is screwed into said hub. As soon as said extension is screwed quite home the next turn of the key in the same direction causes the winding of the mainspring to begin. As soon as the winding is complete the said key is turned in the opposite direction, so as to unscrew said extension and thus detach said key. To set the hands the prismatically-recessed arm *t* of said key is inserted in hollow hub G and pressed back till it engages with the prismatic end of the center-shaft. The use of this arm for regulating the vibration of the pendulum has already been described. It will be evident that this key is susceptible of a triple use.

The back plate, A, and bottom plate, A′, of the clock-case are made in one piece. This construction enables me to conveniently disclose the working of the mechanism while the clock is in position for use. I simply remove the remainder of the case. The bottom A′ then supports the back A and the parts attached thereto, which comprise all the works, and the dial of the clock. The wheels, spring, and pendulum are then easily accessible from all quarters, and any obstruction or imperfection will be readily perceived. In many cases the mechanism may be cleaned or mended without taking it to pieces, and its working may be conveniently exhibited.

The sides Z and top Z′ of the case are made from one piece of metal bent into the long arched shape suited to a pendulum-clock. The front edge of the same is bent inward along its entire length to hold the glass front. The lower ends of said side pieces are connected to a strip, *z*, of metal, which stands out therefrom, and which extends across the space from one side to the other. Said strip is turned in at its lower edge to serve as a support for said glass front, and the portion thus turned in is provided with ears *z*′, which extend vertically up behind the glass. The upper edge of said piece *z* is also turned in to bear against the front of the glass.

Instead of the ordinary winding pawl or dog pressed by a spring against the ratchet-teeth, I employ an automatic verge-like dog, U. (Shown in detail in Fig. 7.) This dog is pivoted to the center-wheel E′, and has an impulse-pallet that is curved slightly inward, and a detent-pallet which has an inwardly-extending nose or point. The inclined part of each tooth on ratchet V acts to press outward said impulse-pallet, and thereby to force inward the other or detent pallet. The latter is thus kept in such position as to catch one of the teeth of said ratchet on the first reverse movement of said ratchet and shaft. As there is no spring-pressure on said dog U it yields very readily to the motion of its ratchet in winding, and it does not make the disagreeable clicking sound which is made by an ordinary spring-pressed pawl.

The hand P may be constructed with any other suitable elastic attaching end instead of the slotted one shown. The latter construction is, however, preferred.

I am aware that it is not broadly new to make a clock with three plates, and that it is not new to put the main wheel and first wheel on the rear side of the middle plate, the center-pinion and the rest of the train of wheels being in front of said plate.

Having thus fully described my invention, what I claim as new, and desire to secure by Letters Patent, is—

1. In combination with a fixed circular rack and a stationary clock-movement, a plate rotated by the mainspring and carrying a device which connects the rack and movement, substantially as and for the purpose set forth.

2. A perforated clock-case back, in combination with a base-plate for the movement, said base-plate being provided with flexible claws, which may pass through the perforations in said clock-case back, substantially as and for the purpose set forth.

3. In combination with mainspring B, perforated at *b*, the lateral attaching-finger *c*′ on flange C′ of plate C, said parts being constructed and applied substantially as and for the purpose set forth.

4. In combination with mainspring B, the fixed plate C and its flanges C′, forming a barrel for said spring, but allowing inspection of the latter between the flanges C′, substantially as set forth.

5. In combination with mainspring B and fixed plate C, the rotating plate F and its hub G, said hub extending through plate C, for the attachment of the spring, substantially as set forth.

6. In combination with ratchet V, a verge-like automatic winding-dog U, held in proper position for catching by the forward motion of said ratchet.

7. In combination with a pillar-plate, a fixed circular rack having an annular inner recess to receive said plate, whereby said rack serves also the purpose of attaching said plate, and the said parts are made to occupy the least possible space.

8. In combination with a perforated front plate, a rear pillar-plate having twisted tongues on the ends of its pillars, whereby said plates and pillars are clamped together, substantially as set forth.

9. In combination with a pendulum-rod and adjustable pendulum-ball, a spring arranged to force said ball down against the adjusting-nut.

10. In combination with a pendulum-rod and an adjustable pendulum-ball, a spring fitted into a recess of said ball and operating to force the latter down against the said nut.

11. In combination with the adjusting-nut of a pendulum, a clock-case bottom perforated at $A^2$, and a key having a prismatic recess fitting said nut, whereby the height of the pendulum-ball may be adjusted by the key from the outside of the clock-case, substantially as set forth.

12. In combination with a hollow internally-screw-threaded winding-hub and a center-shaft, a key having a screw-threaded portion for engaging with said hub, and a prismatically-recessed portion for passing through said hub and engaging with the center-shaft.

13. In combination with the clock-case and the front plate, rear plate, and an intermediate plate, a mainspring, main wheel, and center-pinion arranged behind said intermediate plate, and a train of gearing constituting the remainder of the works arranged in front of said intermediate plate.

14. In combination with the clock case and works, a plate which divides the mainspring, main wheel, and center-pinion from the remainder of the works, said plate being constructed with a central opening which is larger than the center-wheel, in order to allow the removal or inspection of said wheel through said opening.

15. In combination with the first wheel, a mainspring arranged against the back of the clock-case, a train of wheels arranged between the front plate and an intermediate plate, a center-shaft extending beyond the intermediate plate to its bearing in the rear plate, and a pendulum hung above said center-shaft, substantially as set forth.

16. In a clock-movement, a plate having an opening through which the center-shaft passes, said opening being sufficiently large to permit the withdrawal of the center-pinion through the same.

17. In combination with the first wheel and the mainspring arranged against the back of the clock-case, a train of wheels arranged between the front plate and an intermediate plate, a center-shaft extending beyond the center-plate and supported by a bearing in the rear plate, and a pendulum hung above said center-shaft, substantially as set forth.

18. In combination with an adjustable pendulum-ball, a clock-case having an opening at its bottom, which allows the adjustment of said pendulum-ball from the bottom of said case, and renders an opening in the front of said case unnecessary.

19. In combination with an adjustable pendulum-ball, a clock-case having an opening at its bottom, and a key adapted to adjust the height of the pendulum-ball, for the purpose set forth.

20. In combination with a clock-case, mainspring, and train of wheels, a front plate, rear plate, intermediate plate, and center-shaft, the latter having its bearings only in the front and rear plate, substantially as set forth.

In testimony that I claim the foregoing I have hereunto set my hand this 21st day of January, 1881.

ARTHUR E. HOTCHKISS.

Witnesses:

WM. H. BABCOCK,

EDWARD G. SIGGERS.